United States Patent
Tano et al.

(10) Patent No.: US 12,427,576 B2
(45) Date of Patent: Sep. 30, 2025

(54) COMPOSITE PROCESSING MACHINE

(71) Applicant: JTEKT CORPORATION, Kariya (JP)

(72) Inventors: Makoto Tano, Obu (JP); Takaya Nagahama, Obu (JP); Keisuke Usuda, Nagoya (JP); Koichi Shiiba, Nisshin (JP); Kohei Kato, Nagoya (JP); Masato Ito, Kariya (JP)

(73) Assignee: JTEKT CORPORATION, Kariya (JP)

( * ) Notice: Subject to any disclaimer, the term of this patent is extended or adjusted under 35 U.S.C. 154(b) by 85 days.

(21) Appl. No.: 18/681,657

(22) PCT Filed: Sep. 6, 2021

(86) PCT No.: PCT/JP2021/032645
§ 371 (c)(1),
(2) Date: Feb. 6, 2024

(87) PCT Pub. No.: WO2023/032198
PCT Pub. Date: Mar. 9, 2023

(65) Prior Publication Data
US 2024/0335877 A1   Oct. 10, 2024

(51) Int. Cl.
*B22F 10/66* (2021.01)
*B22F 10/28* (2021.01)
(Continued)

(52) U.S. Cl.
CPC ............ *B22F 10/28* (2021.01); *B22F 10/364* (2021.01); *B22F 10/368* (2021.01); *B22F 10/66* (2021.01);
(Continued)

(58) Field of Classification Search
None
See application file for complete search history.

(56) References Cited

U.S. PATENT DOCUMENTS

| | | | |
|---|---|---|---|
| 5,286,573 A * | 2/1994 | Prinz | B22F 3/115 428/419 |
| 7,020,539 B1 | 3/2006 | Kovacevic et al. | |

(Continued)

FOREIGN PATENT DOCUMENTS

| | | | | |
|---|---|---|---|---|
| CN | 104190928 A | * | 12/2014 | ........... B23K 26/342 |
| CN | 109986077 A | * | 7/2019 | ............. B33Y 30/00 |

(Continued)

OTHER PUBLICATIONS

International Search Report mailed on Nov. 22, 2021 in PCT/JP2021/032645 filed on Sep. 6, 2021 (2 pages).

*Primary Examiner* — Yung-Sheng M Tsui
(74) *Attorney, Agent, or Firm* — Oblon, McClelland, Maier &Neustadt, L.L.P.

(57) ABSTRACT

A composite processing machine includes: a holding portion capable of holding a workpiece; a removal processing portion that performs removal processing on the workpiece held by the holding portion, the removal processing portion being capable of performing removal processing of a hard material; an additive manufacturing portion that applies the hard material to a surface of the workpiece held by the holding portion by melting the hard material while supplying the hard material to the surface; and a control unit that controls the composite processing machine. The control unit is configured to: control the additive manufacturing portion to form an additive portion made of the hard material on the surface of the workpiece held by the holding portion; and control the removal processing portion to perform the removal processing on the additive portion formed on the workpiece held by the holding portion.

6 Claims, 7 Drawing Sheets

(51) Int. Cl.
*B22F 10/364* (2021.01)
*B22F 10/368* (2021.01)
*B33Y 30/00* (2015.01)
*B33Y 40/20* (2020.01)

(52) U.S. Cl.
CPC ............. *B33Y 30/00* (2014.12); *B33Y 40/20* (2020.01); *B22F 2203/11* (2013.01); *B22F 2302/10* (2013.01)

(56) References Cited

U.S. PATENT DOCUMENTS

| | | | | |
|---|---|---|---|---|
| 2012/0237745 | A1* | 9/2012 | Dierkes | C04B 35/4885 |
| | | | | 427/532 |
| 2014/0271328 | A1* | 9/2014 | Burris | B23K 26/034 |
| | | | | 419/53 |
| 2017/0232557 | A1* | 8/2017 | DeMuth | B33Y 50/02 |
| | | | | 148/525 |
| 2018/0036835 | A1 | 2/2018 | Kamigawara et al. | |
| 2018/0141160 | A1* | 5/2018 | Karp | B23K 26/0626 |
| 2020/0070249 | A1* | 3/2020 | Ozdoganlar | C25F 3/16 |
| 2021/0197281 | A1 | 7/2021 | Koseki et al. | |
| 2024/0083105 | A1* | 3/2024 | Luick | B22F 12/45 |

FOREIGN PATENT DOCUMENTS

| | | | | |
|---|---|---|---|---|
| JP | 59-50983 A | | 3/1984 | |
| JP | 8-10958 A | | 1/1996 | |
| JP | 2015-527939 A | | 9/2015 | |
| JP | 2017-110239 A | | 6/2017 | |
| JP | 2018-24074 A | | 2/2018 | |
| JP | 2020-515430 A | | 5/2020 | |
| WO | WO 2014/013247 A2 | | 1/2014 | |
| WO | WO 2018/172774 A1 | | 9/2018 | |
| WO | WO-2018217277 A1 | * | 11/2018 | ............ B22F 10/362 |
| WO | WO-2019097265 A1 | * | 5/2019 | ............ B22F 10/28 |
| WO | WO 2020/111231 A1 | | 6/2020 | |

\* cited by examiner

COMPOSITE PROCESSING MACHINE

TECHNICAL FIELD

The present disclosure relates to a composite processing machine.

BACKGROUND ART

In a technique according to Patent Document 1, a cylindrical base material is subjected to overlay processing by laser metal deposition (LMD), and a formed overlaid portion is ground. As a result, a hard metal film constituted from tungsten carbide or chromium is formed on the surface of the cylindrical base material.

It is not easy to grind a hard metal film. Therefore, a dedicated grinding machine has hitherto been used to grind a hard metal film. In the technique according to Patent Document 1, the following processes are sequentially executed. A cylindrical base material is attached to a device that executes LMD. LMD is executed on the cylindrical base material while rotating the base material. The cylindrical base material is removed from the device that executes LMD. The cylindrical base material is attached to a dedicated grinding machine for grinding a hard metal film. The grinding machine performs grinding on a surface of an overlaid portion of the cylindrical base material while rotating the base material.

RELATED ART DOCUMENTS

Patent Documents

Patent Document 1: Japanese Unexamined Patent Application Publication No. 2017-110239 (JP 2017-110239 A)

SUMMARY OF THE INVENTION

Problem to be Solved by the Invention

In the above technique, the base material is attached to the device that executes LMD, the base material is removed from the device that executes LMD, and the base material is attached to the dedicated grinding machine. Therefore, the work of transporting the base material between the processing devices and setting up the devices is not needed between the processes. Hence, the process of forming an additive portion on the surface of a workpiece and shaping the additive portion through removal processing cannot be performed efficiently.

Means for Solving the Problem

The present disclosure can be implemented as the following aspects.

(1) An aspect of the present disclosure provides a composite processing machine. The composite processing machine includes: a holding portion that is configured to hold a workpiece; a removal processing portion that performs removal processing on the workpiece held by the holding portion, the removal processing portion configured to perform removal processing of a hard material; an additive manufacturing portion that applies the hard material to a surface of the workpiece held by the holding portion by melting the hard material while supplying the hard material to the surface; and a control unit that controls the composite processing machine. The control unit is configured to: control the additive manufacturing portion to form an additive portion made of the hard material on the surface of the workpiece held by the holding portion; and control the removal processing portion to perform removal processing on the additive portion formed on the workpiece held by the holding portion.

With such an aspect, it is possible to form an additive portion of a hard material on the surface of the workpiece and performing removal processing on the additive portion without removing the workpiece or attaching the workpiece again. Therefore, the processes of forming an additive portion on the surface of the workpiece and shaping the additive portion through removal processing can be performed efficiently compared to an aspect in which different devices are used to form an additive portion on the surface of the workpiece and perform removal processing on the additive portion.

(2) In the composite processing machine according to the above aspect, the additive manufacturing portion may include a material supply portion that supplies powder of cemented carbide as the hard material, a first beam emission portion that emits a first light beam that melts the powder of the cemented carbide, and a second beam emission portion that emits a second light beam; and the control unit may control the additive manufacturing portion to apply the molten cemented carbide as the additive portion to the surface by causing the material supply portion to supply the powder and causing the first beam emission portion to emit the first light beam toward the powder, and reduce a reduction speed of a temperature of the molten cemented carbide by causing the second beam emission portion to emit the second light beam toward the molten cemented carbide.

With such an aspect, it is possible to reduce the possibility that quench cracking is caused in the additive portion formed on the workpiece compared to an aspect in which the second light beam is not emitted toward the molten cemented carbide.

(3) In the composite processing machine according to the above aspect, the control unit may control the additive manufacturing portion to keep the reduction speed at 540° C./second or less by causing the second beam emission portion to emit the second light beam toward the molten cemented carbide.

With such an aspect, it is possible to form an additive portion of cemented carbide on the surface of the workpiece and perform removal processing on the additive portion without causing quench cracking in the additive portion formed on the workpiece. It is possible to form an additive portion with high shape precision made of cemented carbide on the surface of the workpiece.

(4) In the composite processing machine according to the above aspect, the additive manufacturing portion may form an additive layer as the additive portion by applying the hard material to the surface of the workpiece being held by the holding portion; and the removal processing portion may include a grindstone, and performs grinding by bringing the grindstone into contact with the workpiece being held by the holding portion while rotating the grindstone.

With such an aspect, an additive layer with high shape precision can be formed on the surface of the workpiece by performing grinding on the formed additive layer.

(5) In the composite processing machine according to the above aspect, the control unit may control the additive manufacturing portion to form the additive layer on the surface of the workpiece with a thickness that is enough to withstand the removal processing by the removal processing portion.

With such an aspect, it is not necessary to prepare a workpiece with hardness enough to support the additive layer during removal processing. Therefore, it is possible to prepare a workpiece with hardness that meets the purpose of use of the workpiece, irrespective of the content of removal processing in a manufacturing step.

(6) In the composite processing machine according to the above aspect, the control unit may control the additive manufacturing portion to form the additive layer on the surface of the workpiece with a thickness that is enough to withstand an expected value of a maximum load applied when the workpiece is used as a product.

With such an aspect, it is not necessary to prepare a workpiece with hardness enough to support the additive layer when the workpiece is used as a product and receives a load. Therefore, it is possible to prepare a workpiece with hardness that meets the purpose of use of the workpiece.

(7) In the composite processing machine according to the above aspect, the control unit may not perform a heat treatment of the workpiece before the removal processing performed on the additive layer.

With such an aspect, it is possible to shorten the time required to form an additive layer on the surface of the workpiece compared to an aspect in which a heat treatment is performed on the workpiece by the first beam emission portion or the second beam emission portion before removal processing.

(8) In the composite processing machine according to the above aspect, the control unit may be configured to repair a defect on a surface of the additive layer by melting a part of the surface of the additive layer by controlling at least one of the first beam emission portion of the additive manufacturing portion and the second beam emission portion of the additive manufacturing portion after formation of the additive layer.

With such an aspect, the surface properties of the workpiece can be improved. Therefore, it is possible to form an additive layer with high shape precision made of cemented carbide on the surface of the workpiece.

The present disclosure can be implemented in a variety of aspects other than the composite processing machine. For example, the present disclosure can be implemented in aspects such as a processing device, a method of manufacturing the processing device, a method of controlling the processing device, a computer program that implements the control method, and a non-transitory storage medium that stores the computer program.

MODES FOR CARRYING OUT THE INVENTION

A. Embodiment

Figure 1:
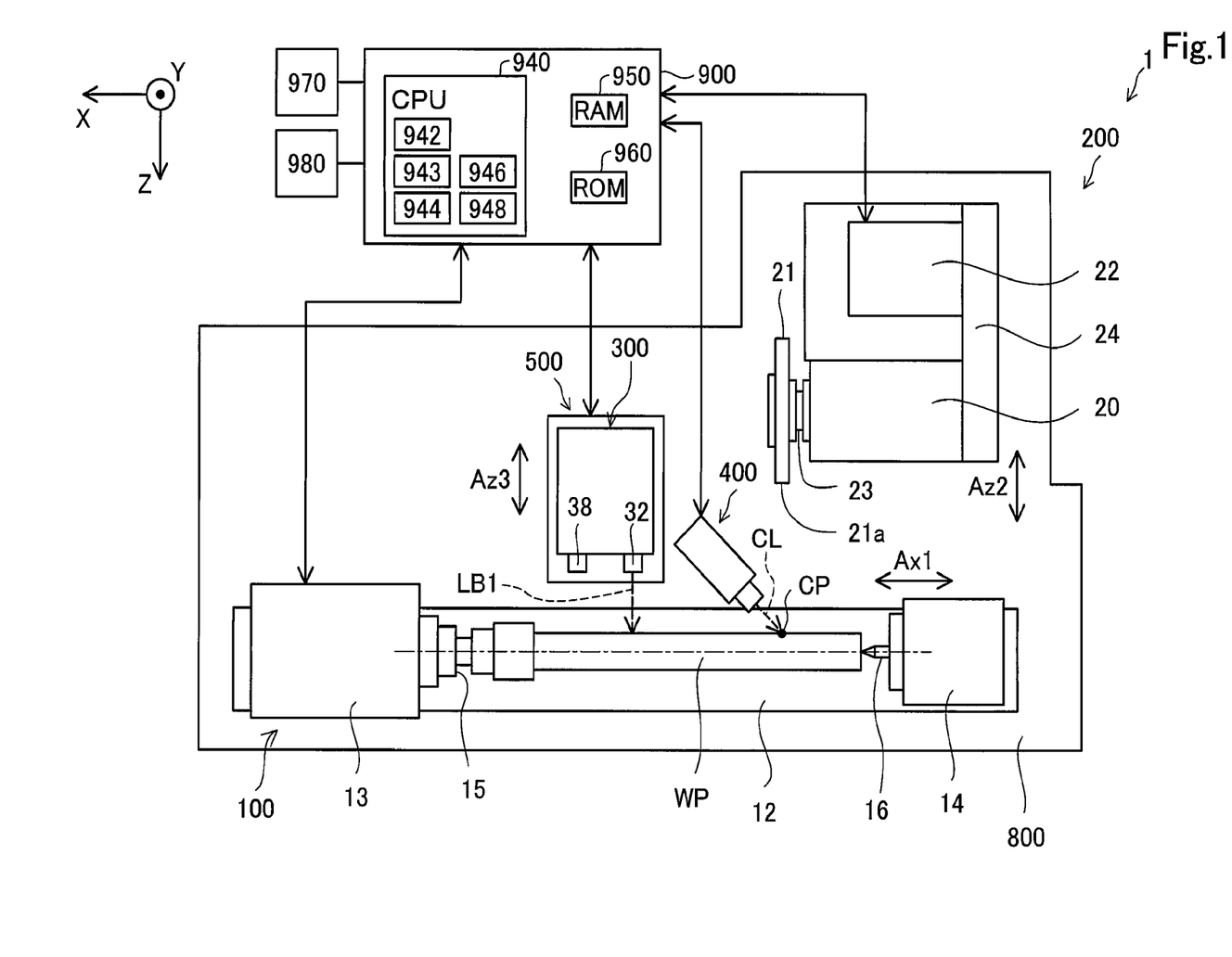
FIG. 1 illustrates a composite grinding machine 1 according to an embodiment.

FIG. 1 illustrates a composite grinding machine 1 according to an embodiment. FIG. 1 corresponds to a plan view. However, FIG. 1 does not accurately represent the dimensions and shapes of various portions. In FIG. 1, some components of the composite grinding machine 1 are not illustrated, in order to facilitate understanding of the technology.

The composite grinding machine 1 can perform additive manufacturing (AM) and grinding as removal processing on a cylindrical workpiece WP. The composite grinding machine 1 includes a holding portion 100, a grinding portion 200, an additive manufacturing portion 300, a coolant supply portion 400, a protection portion 500, a detection portion 38, a bed 800, and a control unit 900.

The holding portion 100 can hold the workpiece WP (see the lower part of FIG. 1). Further, the holding portion 100 can rotate the workpiece WP being held. The holding portion 100 is provided so as to be movable in the horizontal direction with respect to the bed 800. The holding portion 100 includes a table 12, a headstock 13, and a tailstock 14.

The table 12 is provided on the bed 800. The table 12 is provided so as to be movable in the horizontal direction with respect to the bed 800. Herein, the direction in which the table 12 is movable is referred to as an X-axis direction. In FIG. 1, movement of the holding portion 100 is indicated by an arrow AX1 (see the lower right part of FIG. 1).

The headstock 13 is provided on the table 12. The headstock 13 includes a chuck 15. The chuck 15 holds one end of the cylindrical workpiece WP. The headstock 13 can rotate the chuck 15.

The tailstock 14 is provided on the table 12. The tailstock 14 includes a center 16. The center 16 holds the other end of the cylindrical workpiece WP. The workpiece WP is rotated by the headstock 13 about a rotational axis that is parallel to the X-axis direction with both ends of the workpiece WP held by the chuck 15 of the headstock 13 and the center 16 of the tailstock 14. The rotational axis of the headstock 13 is indicated by a long dashed short dashed line that is parallel to the X-axis direction in FIGS. 1 and 3 to 5.

The grinding portion 200 has a function of performing grinding on the workpiece WP held by the holding portion 100 (see the middle right part of FIG. 1). Specifically, the grinding portion 200 performs grinding by bringing a grindstone wheel 21 into contact with the workpiece WP, being rotated by the holding portion 100, while rotating the grindstone wheel 21. By the grinding portion 200 performing grinding on an additive layer Md formed on a surface Sw of the workpiece WP by the additive manufacturing portion 300, an additive layer Md with high shape precision is formed on the surface Sw of the workpiece WP.

The grinding portion 200 can perform grinding of a hard material. Herein, the "hard material" is a material including one or more materials selected from the group consisting of diamond, silicon carbide, boron carbide, titanium carbide, tungsten carbide, cubic boron nitride, titanium nitride, silicon nitride, aluminum nitride, and alumina. Specifically, the "hard material" includes cemented carbide, high-speed steel, and ceramics.

Herein, the "cemented carbide" is an alloy obtained by sintering powder of one or two or more kinds of carbides of TI, Zr, Hf, V, Nb, Ta, Cr, Mo, and W which are metals of groups IVa, Va, and VIa (groups 4, 5, and 6) of the periodic table and powder of an iron group metal such as Fe, Co, and Ni.

Herein, the "high-speed steel" is high-carbon steel containing 0.7 to 1.6% of carbon and to which 3.8 to 4.5% of Cr, 1 to 5% of V, and 17 to 22% of W are added, or high-carbon steel containing 0.7 to 1.6% of carbon and to which 3.8 to 4.5% of Cr, 1 to 5% of V, 5.5 to 11.0% of W, and 4.5 to 6.2% of Mo are added. Examples of the high-speed steel include HSS prescribed by the ISO, and SKH2, SKH3, SKH4, SKH10, SKH40, SKH50, SKH51, SKH52, SKH53, SKH54, SKH55, SKH56, SKH57, SKH58, and SKH59 prescribed by JIS G4403 (2015).

The grinding portion 200 includes a grindstone head 20, the grindstone wheel 21, a grindstone drive motor 22, a grindstone shaft 23, and a belt transmission mechanism 24.

The grindstone head 20 is provided on the bed 800. The grindstone head 20 is provided so as to be movable in the horizontal direction with respect to the bed 800. The direction in which the grindstone head 20 is movable is perpendicular to the direction in which the table 12 is movable. Herein, the direction in which the grindstone head 20 is movable is referred to as a Z-axis direction. In FIG. 1, movement of the grinding portion 200 is indicated by an arrow Az2 (see the middle right part of FIG. 1). Herein, the vertically upper side is defined as a Y-axis positive direction. An orthogonal coordinate system defined by an X-axis, a Y-axis, and a Z-axis is illustrated in FIG. 1.

The grindstone shaft 23 is supported by the grindstone head 20 so as to be rotatable about a direction that is parallel to the X-axis. The grindstone wheel 21 is a disc-shaped grindstone. The grindstone wheel 21 is connected to the grindstone shaft 23 such that the central axis of the disc and the central axis of the grindstone shaft 23 coincide with each other. A cylindrical grinding surface 21a that is parallel to the X-axis direction is provided on the outer peripheral surface of the disc of the grindstone wheel 21.

The grindstone drive motor 22 is supplied with power to output a rotational output. The grindstone drive motor 22 is fixed to the grindstone head 20. The belt transmission mechanism 24 transfers the rotational output of the grindstone drive motor 22 to the grindstone shaft 23. That is, the grinding portion 200 rotates the grindstone wheel 21 using the grindstone drive motor 22 via the belt transmission mechanism 24.

The surface of the cylindrical workpiece WP is ground by the grinding portion 200 pressing the cylindrical grinding surface 21a of the rotating grindstone wheel 21 against the surface Sw of the workpiece WP while the holding portion 100 is rotating the workpiece WP.

The grinding portion 200 is movable in the Z-axis direction with respect to the holding portion 100 by the grindstone head 20 (see Az2 in the middle right part of FIG. 1). On the other hand, the holding portion 100 is movable in the X-axis direction while rotating the workpiece WP (see Ax1 in the lower right part of FIG. 1). Therefore, traverse grinding as removal processing can be executed on the workpiece WP, held by the holding portion 100, by the grinding portion 200 and the holding portion 100 controlled by the control unit 900.

The coolant supply portion 400 supplies a coolant CL to a portion CP at which the workpiece WP held by the holding portion 100 and the grindstone wheel 21 contact each other (see the lower right part of FIG. 1). The coolant supply portion 400 is fixed with respect to the grinding portion 200. In FIG. 1, however, the coolant supply portion 400 is illustrated independently of the grinding portion 200, in order to facilitate understanding of the technology. The coolant supply portion 400 includes a tank that stores the coolant CL and a pump that pumps the coolant CL in the tank to the portion CP at which the workpiece WP and the grindstone wheel 21 contact each other.

Figure 2:
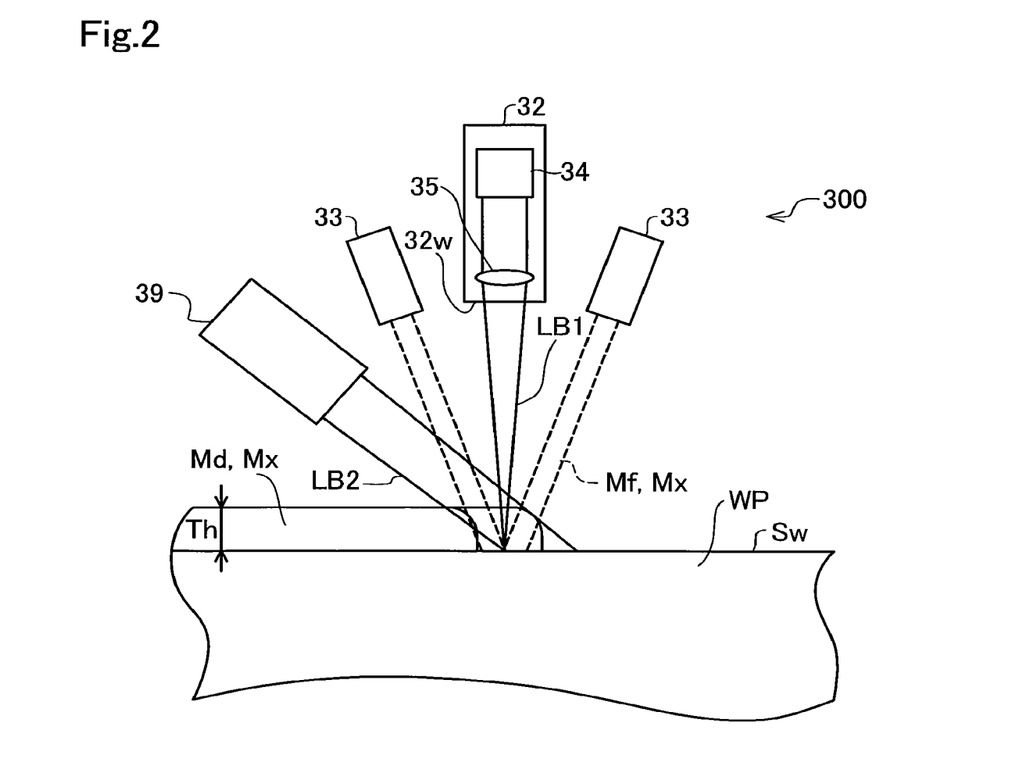
FIG. 2 illustrates the configuration of a part of an additive manufacturing portion 300 in detail.

FIG. 2 illustrates the configuration of a part of the additive manufacturing portion 300 in detail. The additive manufacturing portion 300 has a function of performing additive manufacturing on the surface Sw of the workpiece WP held by the holding portion 100 (see the center part of FIG. 1). More specifically, the additive manufacturing portion 300 forms an additive layer Md on the surface Sw of the workpiece WP by applying a hard material Mx to the surface Sw of the workpiece WP being rotated by the holding portion 100. The additive manufacturing portion 300 is movable in the Z-axis direction with respect to the holding portion 100. In FIG. 1, movement of the additive manufacturing portion 300 is indicated by an arrow Az3 (see the middle left part of FIG. 1). The additive manufacturing portion 300 includes a first beam emission portion 32, a material supply portion 33, and a second beam emission portion 39.

The first beam emission portion 32 emits a first light beam LB1 to the outside of the additive manufacturing portion 300. The first beam emission portion 32 includes an oscillation portion 34 and an optical system 35. The oscillation portion 34 emits a light beam. The optical system 35 converges the light beam emitted by the oscillation portion 34 to a focal point located at a position determined in advance with respect to the first beam emission portion 32. The first light beam LB1 melts cemented carbide powder Mf on the surface Sw of the workpiece WP in the vicinity of the focal point. In FIG. 2, the optical system 35 is illustrated in the shape of a single convex lens, in order to facilitate understanding of the technology. The first beam emission portion 32 including the optical system 35 is an optical device that is used to apply a material to the surface Sw of the workpiece WP.

The material supply portion 33 supplies the cemented carbide powder Mf containing tungsten carbide and cobalt as a binder to the outside of the additive manufacturing portion 300. The direction of emission of the first light beam LB1 by the first beam emission portion 32 and the direction of emission of the cemented carbide powder Mf by the material supply portion 33 intersect each other at the focal point of the first light beam LB1. As a result, the cemented carbide powder Mf supplied by the material supply portion 33 is melted by the first light beam LB1. That is, the additive manufacturing portion 300 can apply the cemented carbide powder Mf as the material to the surface Sw of the workpiece WP by melting the material while supplying the material to the surface Sw of the workpiece WP held by the holding portion 100. As a result, an additive portion made of cemented carbide can be formed at a desired portion on the surface Sw of the workpiece WP. The additive manufacturing portion 300 performs directed energy deposition (DED). More specifically, the additive manufacturing portion 300 performs laser metal deposition (LMD).

Herein, the material in the powder state is called "powder Mf". The structure formed by melting the powder Mf and applying the molten powder Mf to the surface Sw of the workpiece WP is called an "additive portion Md" or an "additive layer Md". The powder Mf and the material constituting the additive layer Md are collectively referred to as a "material Mx" or a "hard material Mx".

The second beam emission portion 39 emits the second light beam LB2 to the outside of the additive manufacturing portion 300. The second beam emission portion 39 includes components corresponding to the components of the first beam emission portion 32. However, the range of irradiation on the surface Sw of the workpiece WP with the second light beam LB2 is wider than the range of irradiation on the surface Sw of the workpiece WP with the first light beam LB1. The additive manufacturing portion 300 is configured such that the range of irradiation of the hard material Mx on the surface Sw of the workpiece WP with the second light beam LB2 includes the range of irradiation of the hard material Mx on the surface Sw of the workpiece WP with the first light beam LB1.

A part of the second light beam LB2 preheats the cemented carbide powder Mf on the surface Sw of the workpiece WP prior to the first light beam LB1 melting the powder Mf. Another part of the second light beam LB2 is used to control the reduction speed of the temperature of cemented carbide after being melted on the surface Sw of the workpiece WP. Operation of the second beam emission portion 39 will be described later.

An annular additive portion Md centered on the central axis of the workpiece WP is formed on the surface Sw of the cylindrical workpiece WP by the additive manufacturing portion 300 applying the material Mx to the surface Sw of the workpiece WP while the holding portion 100 is rotating the workpiece WP.

The additive manufacturing portion 300 is movable in the Z-axis direction with respect to the holding portion 100 (see Az3 in the middle left part of FIG. 1). On the other hand, the holding portion 100 is movable in the X-axis direction while rotating the workpiece WP (see Ax1 in the lower right part of FIG. 1). Therefore, an additive layer Md is formed on the surface Sw of the workpiece WP by cemented carbide being applied to the surface Sw of the workpiece WP, held and rotated by the holding portion 100, by the additive manufacturing portion 300 and the holding portion 100 controlled by the control unit 900. However, the surface of the additive layer Md is not flat, but has peaks and valleys that are generally parallel to the circumferential direction of the cylindrical workpiece WP.

The detection portion 38 is an infrared camera (see the center part of FIG. 1). The detection portion 38 is fixed to the additive manufacturing portion 300. The detection portion 38 can acquire the state of the workpiece WP. For example, the detection portion 38 can detect the coolant CL applied to the surface Sw of the workpiece WP. In addition, the detection portion 38 can acquire the state of the workpiece WP irradiated with the first light beam LB1. The detection portion 38 is an optical device that is used to apply a material to the surface Sw of the workpiece WP.

The bed 800 supports the holding portion 100, the grinding portion 200, the additive manufacturing portion 300, the coolant supply portion 400, the protection portion 500, and the detection portion 38. The holding portion 100 is movable in the X-axis direction on the bed 800 (see Ax1 in the lower right part of FIG. 1). The additive manufacturing portion 300 and the detection portion 38 fixed to the additive manufacturing portion 300 are movable together in the Z-axis direction on the bed 800 (see Az3 in the center part of FIG. 1). The grinding portion 200 and the coolant supply portion 400 fixed to the grinding portion 200 are movable together in the Z-axis direction (see Az2 in the lower right part of FIG. 1).

The control unit 900 controls the holding portion 100, the grinding portion 200, the additive manufacturing portion 300, the coolant supply portion 400, the protection portion 500, and the detection portion 38. The control unit 900 is a computer that includes a display 970 that functions as an output device and a keyboard 980 that functions as an input device (see FIG. 1). Further, the control unit 900 includes a CPU 940 as a processor, a RAM 950, and a ROM 960. The CPU 940 causes the holding portion 100, the grinding portion 200, the additive manufacturing portion 300, the coolant supply portion 400, the protection portion 500, and the detection portion 38 to implement various functions by loading a computer program stored in the ROM 960 into the RAM 950 and executing the computer program.

The control unit 900 controls the various portions as follows, for example. The control unit 900 controls the additive manufacturing portion 300 to form an additive portion Md made of the hard material Mx on the surface Sw of the workpiece WP held by the holding portion 100. The control unit 900 controls the grinding portion 200 to perform removal processing on the additive portion Md formed on the workpiece WP held by the holding portion 100.

As a result, the composite grinding machine 1 can form an additive portion Md of a hard material on the surface Sw of the workpiece WP and perform grinding as removal processing on the additive portion Md without removing the workpiece WP and attaching the workpiece WP again. Therefore, misalignment in position among a plurality of times of attachment of the workpiece WP does not affect the precision of the shape and dimensions of the additive portion Md formed on the surface Sw of the workpiece WP. Hence, a portion that exceeds a thickness necessary for a product, that is, a so-called processing allowance, can be reduced in the additive portion Md formed on the surface Sw of the workpiece WP, compared to an aspect in which different devices are used to form an additive portion Md on the surface Sw of the workpiece WP and perform removal processing on the additive portion Md.

Figure 3:
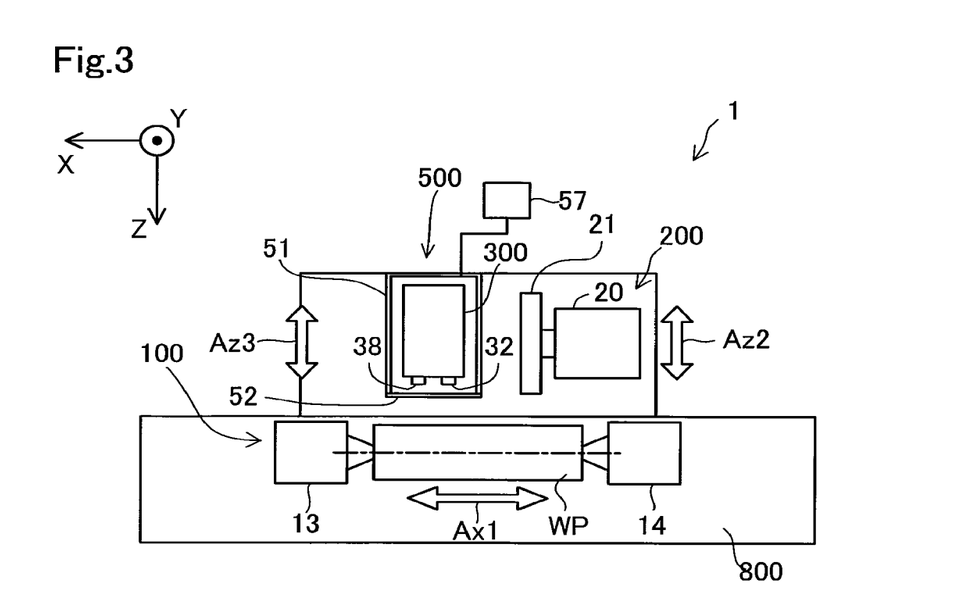
FIG. 3 illustrates the configuration and operation of a protection portion 500 and the additive manufacturing portion 300.
Figure 4:
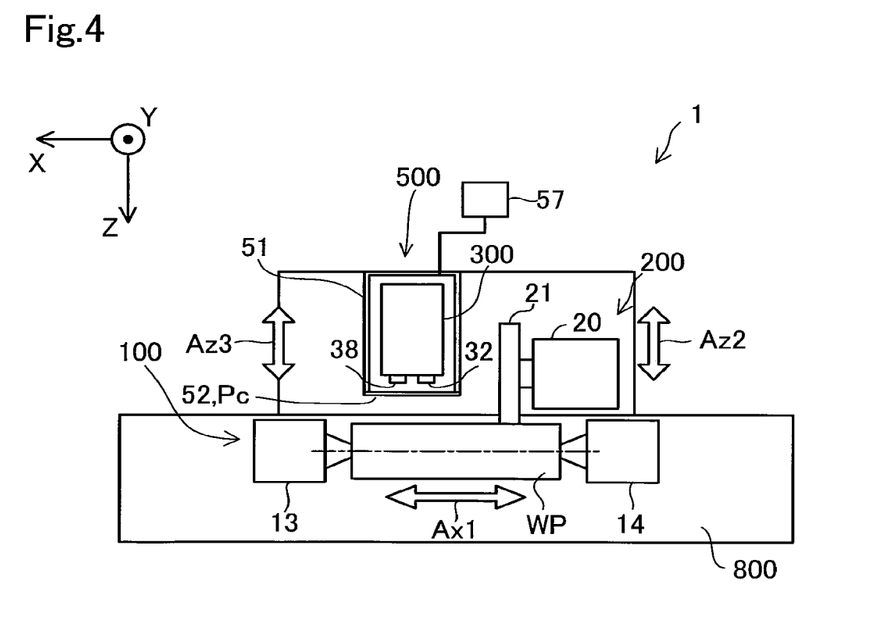
FIG. 4 illustrates the state of the protection portion 500 and the additive manufacturing portion 300 at the time when a workpiece WP is ground by a grindstone wheel 21 of a grinding portion 200.
Figure 5:
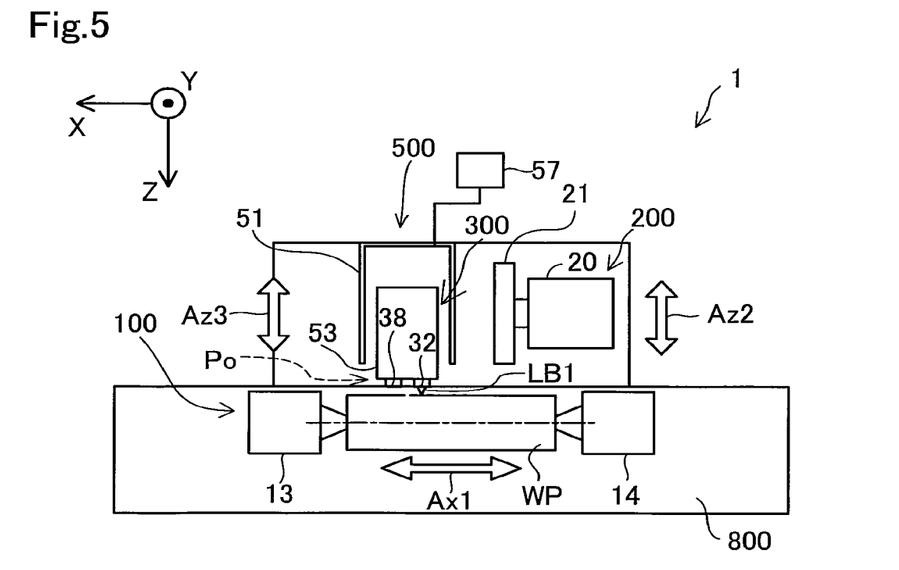
FIG. 5 illustrates the state of the protection portion 500 and the additive manufacturing portion 300 at the time when the additive manufacturing portion 300 applies a material Mx to a surface Sw of the workpiece WP.

FIG. 3 illustrates the configuration and operation of the protection portion 500 and the additive manufacturing portion 300. FIGS. 3 to 5 correspond to a plan view. However, FIGS. 3 to 5 do not accurately represent the dimensions and shapes of various portions. In FIGS. 3 to 5, some components of the composite grinding machine 1 are not illustrated, in order to facilitate understanding of the technology. For example, the material supply portion 33 and the second beam emission portion 39 (see FIG. 2) of the additive manufacturing portion 300 are not illustrated in FIGS. 3 to 5.

The protection portion 500 prevents application of the coolant CL to the first beam emission portion 32, the second beam emission portion 39, and the detection portion 38 (see the upper center part of FIG. 3). The protection portion 500 includes a cover 51 and a pressurization portion 57.

The cover 51 covers the first beam emission portion 32, the second beam emission portion 39, and the detection portion 38. The cover 51 has an opening 53 and a lid portion 52. The lid portion 52 can open and close the opening 53. The protection portion 500 can selectively dispose the lid portion 52 at an open position Po and a closed position Pc.

FIG. 4 illustrates the state of the protection portion 500 and the additive manufacturing portion 300 at the time when the workpiece WP being held by the holding portion 100 is ground by the grindstone wheel 21 of the grinding portion

200. When the workpiece WP being held by the holding portion 100 is ground by the grindstone wheel 21 of the grinding portion 200, the grinding portion 200 is moved to a position closer to the rotational axis of the headstock 13 than the state in FIG. 3 (see Az2 in FIG. 4).

When the workpiece WP being held by the holding portion 100 is ground by the grindstone wheel 21 of the grinding portion 200, the lid portion 52 is disposed at the closed position Pc (see the center part of FIG. 4). In this state, the additive manufacturing portion 300 is located within the cover 51. That is, the first beam emission portion 32, the second beam emission portion 39, and the detection portion 38 are covered by the cover 51. Thus, the first beam emission portion 32 cannot emit the first light beam LB1 to the surface Sw of the workpiece WP. The second beam emission portion 39 cannot emit the second light beam LB2 to the surface Sw of the workpiece WP. The detection portion 38 cannot acquire the state of the workpiece WP.

FIG. 5 illustrates the state of the protection portion 500 and the additive manufacturing portion 300 at the time when the additive manufacturing portion 300 applies the material Mx to the surface Sw of the workpiece WP. When the additive manufacturing portion 300 applies the material Mx to the surface Sw of the workpiece WP, the grinding portion 200 is moved to a position farther from the rotational axis of the headstock 13 than the state in FIG. 4 (see Az2 in FIG. 5).

When the additive manufacturing portion 300 applies the material Mx to the surface Sw of the workpiece WP, the lid portion 52 is disposed at the open position Po (see the center part of FIG. 5). When the lid portion 52 is located at the open position Po, the opening 53 of the cover 51 is opened. At this time, the lid portion 52 is moved upward, that is, in the Y-axis positive direction, from a position at which the lid portion 52 closes the opening of the cover 51 illustrated in FIG. 4. In FIG. 5, the lid portion 52 retracted upward is not illustrated. The additive manufacturing portion 300 is moved along the Z-axis direction through the opening of the cover 51 to a position closer to the rotational axis of the headstock 13 than the state in FIG. 4 (see Az3 in the middle left part of FIG. 5). That is, the first beam emission portion 32, the second beam emission portion 39, and the detection portion 38 are not covered by the cover 51.

In this state, the first beam emission portion 32 emits the first light beam LB1 to the surface Sw of the workpiece WP through the opening 53. The second beam emission portion 39 emits the second light beam LB2 to the surface Sw of the workpiece WP through the opening 53. The material supply portion 33 supplies the cemented carbide powder Mf to the surface Sw of the workpiece WP through the opening 53. The detection portion 38 takes in light reflected by the workpiece WP through the opening 53.

With this configuration, it is possible to reduce the possibility that the precision of application of the material Mx to the surface Sw by the additive manufacturing portion 300 is reduced with the coolant CL, splashed by the rotating grindstone wheel 21 and the rotating workpiece WP, applied to the first beam emission portion 32, the second beam emission portion 39, and the detection portion 38 in the composite grinding machine 1 including the grinding portion 200 and the additive manufacturing portion 300. In addition, it is possible to reduce the possibility that the first beam emission portion 32, the second beam emission portion 39, and the detection portion 38 break down with the coolant CL applied to the first beam emission portion 32, the second beam emission portion 39, and the detection portion 38.

More specifically, when droplets of the coolant CL, splashed by the rotating grindstone wheel 21 and the rotating workpiece WP, fly toward the first beam emission portion 32, the second beam emission portion 39, and the detection portion 38, the droplets are applied to the cover 51 covering the first beam emission portion 32, the second beam emission portion 39, and the detection portion 38 with the lid portion 52 closed. Therefore, it is possible to reduce the possibility that the coolant CL is applied to the first beam emission portion 32, the second beam emission portion 39, and the detection portion 38.

The pressurization portion 57 can increase the pressure in a space within the cover 51 that accommodates the first beam emission portion 32, the second beam emission portion 39, and the detection portion 38. The pressurization portion 57 is specifically a compressor. The pressurization portion 57 maintains the pressure in the space within the cover 51 with the opening 53 closed at a higher level than the pressure around the cover 51 by compressing outside air and supplying the compressed air into the cover 51.

With this configuration, it is possible to reduce the possibility that droplets of the coolant CL intrude into the space within the cover 51 through a clearance around the lid portion 52 to be applied to the first beam emission portion 32, the second beam emission portion 39, and the detection portion 38, even when there are minute droplets of the coolant CL floating around the composite grinding machine 1.

Figure 6:
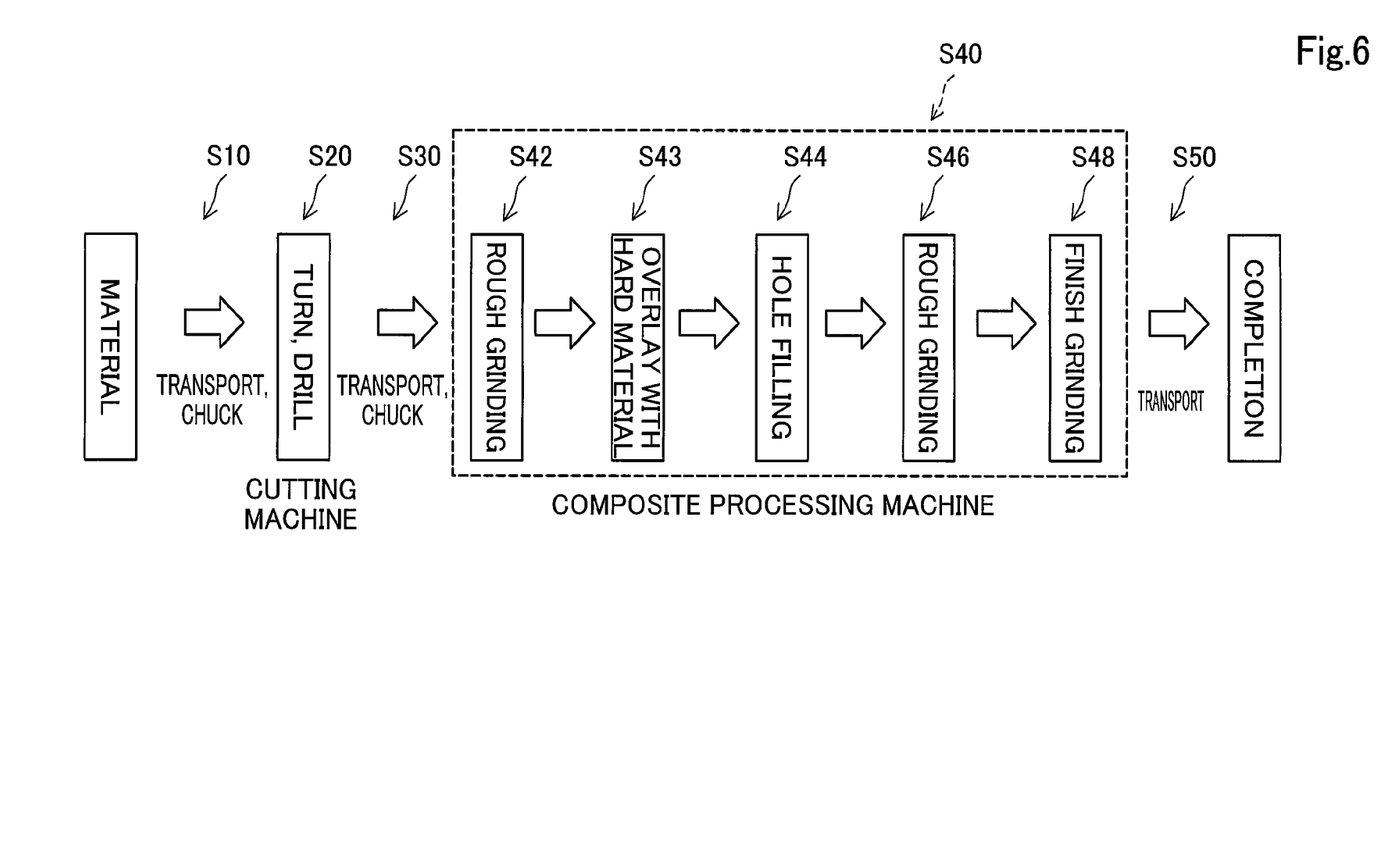
FIG. 6 is a flowchart illustrating processing of the workpiece WP.

FIG. 6 is a flowchart illustrating processing of the workpiece WP. First, a cylindrical workpiece WP before being processed is prepared as a material to be processed (see the right part of FIG. 6). Herein, both the object before being subjected to the processing in FIG. 6 and the object after being subjected to the processing in FIG. 6 are referred to as a workpiece WP.

In step S10, the workpiece WP is transported to a cutting machine that is different from the composite grinding machine 1, and attached to a chuck of the cutting machine.

In step S20, turning and drilling are performed on the workpiece WP using the cutting machine. In step S30, the workpiece WP is removed from the cutting machine. Then, the workpiece WP is transported to the composite grinding machine 1 according to the present embodiment, and attached to the headstock 13 of the composite grinding machine 1 (see the lower part of FIG. 1).

In step S40, additive manufacturing and grinding as removal processing are performed on the workpiece WP using the composite grinding machine 1. Step S40 includes steps S42, S43, S44, S46, and S48. The workpiece WP is continuously held by the headstock 13 and the tailstock 14 without being removed from the headstock 13 and the tailstock 14 while steps S42, S43, S44, S46, and S48 are performed.

In step S42, rough grinding is performed on the workpiece WP. More specifically, the control unit 900 controls the grinding portion 200 to perform grinding as removal processing on the workpiece WP while controlling the holding portion 100 so as to rotate the workpiece WP. As a result, rough grinding is performed on the workpiece WP, being rotated by the holding portion 100, with the grinding portion 200 bringing the grindstone wheel 21 into contact with the workpiece WP while rotating the grindstone wheel 21. The coolant supply portion 400 supplies the coolant CL to the portion CP at which the workpiece WP held by the holding portion 100 and the grindstone wheel 21 contact each other.

At this time, the grindstone wheel 21 for rough grinding in step S42 is attached to the grinding portion 200. The lid portion 52 of the protection portion 500 is disposed at the closed position Pc (see the center part of FIG. 4). The first beam emission portion 32, the second beam emission portion 39, and the detection portion 38 are covered by the cover 51 of the protection portion 500. A functional unit of the CPU 940 that implements a process of performing rough grinding by controlling the various portions of the composite grinding machine 1 in step S42 is indicated as a first rough grinding unit 942 in FIG. 1.

After the completion of rough grinding, the grinding portion 200 is moved to a position farther from the rotational axis of the headstock 13 than the state in FIG. 4 (see Az2 in FIG. 5). The lid portion 52 of the protection portion 500 is disposed at the open position Po (see the center part of FIG. 5). Then, the additive manufacturing portion 300 is moved to a position closer to the rotational axis of the headstock 13 than the state in FIG. 4 through the opening of the cover 51 under control by the control unit 900 (see Az3 in FIG. 5).

After that, the grindstone wheel for rough grinding in step S42 attached to the grinding portion 200 is replaced with a grindstone wheel for rough grinding in step S46.

In step S43, overlay processing of a hard material is performed. More specifically, an additive layer Md made of cemented carbide is formed on the surface Sw of the workpiece WP by the additive manufacturing portion 300 (see FIG. 2).

In step S43, the control unit 900 first detects the coolant CL applied to the surface Sw of the workpiece WP using the detection portion 38. Then, the control unit 900 controls the outputs of the first light beam LB1 and the second light beam LB2 for applying the material Mx to the surface Sw based on the detection result from the detection portion 38 such that functions to be discussed later can be implemented.

By performing such processing, the outputs of the first light beam LB1 and the second light beam LB2 can be increased in consideration of the effect of the coolant CL when the coolant CL remains on the surface Sw of the workpiece WP processed by the additive manufacturing portion 300. Therefore, it is possible to reduce the possibility that the precision of application of the material Mx to the surface Sw by the additive manufacturing portion 300 is reduced because of the coolant CL applied to the workpiece WP.

The control unit 900 controls the additive manufacturing portion 300 so as to function as follows. The material supply portion 33 supplies the powder Mf as a material to the surface Sw of the workpiece WP. The first beam emission portion 32 emits the first light beam LB1 toward the powder Mf. As a result, molten cemented carbide is applied as the additive portion Md to the surface Sw of the workpiece WP (see FIG. 2). The second beam emission portion 39 emits the second light beam LB2 toward the molten cemented carbide. As a result, the reduction speed of the temperature of the molten cemented carbide is reduced compared to an aspect in which the second light beam LB2 is not emitted. More specifically, the control unit 900 controls the output of the second light beam LB2 such that the reduction speed of the temperature of the molten cemented carbide is kept at 540° C./second or less at the freezing point of cobalt that functions as a binder. The second beam emission portion 39 also emits the second light beam LB2 to the cemented carbide powder Mf before being melted (see FIG. 2). As a result, the cemented carbide powder Mf is preheated prior to being melted by the first light beam LB1.

When the temperature of cemented carbide applied to the surface Sw of the workpiece WP is reduced rapidly, quench cracking may be caused in the additive portion Md to be formed because of contraction of cemented carbide that accompanies the reduction in the temperature. When the reduction speed of the temperature of cemented carbide is low, on the other hand, a strain due to contraction of cemented carbide is uniformly distributed over a wide range of the additive portion Md. That is, a large strain does not concentrate on a part of the additive portion Md. Therefore, it is not likely that quench cracking is caused in the additive portion Md.

In the present embodiment, by keeping the reduction speed of the temperature of the molten cemented carbide at 540° C./second or less, it is possible to form an additive portion Md of cemented carbide on the surface Sw of the workpiece WP without causing quench cracking in the additive portion Md formed on the workpiece WP, and to thereafter perform removal processing on the additive portion Md. That is, it is possible to form an additive portion Md with high shape precision made of cemented carbide on the surface Sw of the workpiece WP.

In step S43, the control unit 900 controls the additive manufacturing portion 300 to form an additive layer Md on the surface Sw of the workpiece WP with a thickness Th that allows the additive layer Md to withstand grinding by the grinding portion 200 in steps S46 and S48 (see FIG. 2). Herein, the expression "thickness that is enough to withstand X" when used for a certain layer indicates that the layer is not broken even after being subjected to X. The thickness Th of the additive layer Md to be formed is set in advance based on the material of the additive layer Md, the temperature to be reached by the material of the additive layer Md because of the first light beam LB1 and the second light beam LB2, the curvature of the surface Sw of the workpiece WP, etc. In the present embodiment, the material of the additive layer Md is cemented carbide. Therefore, by forming an additive layer Md with an appropriate thickness Th, the amount of deformation of the additive layer Md in steps S46 and S48 is suppressed by the additive layer Md itself to such a degree that grinding can be performed with sufficient precision during grinding.

In the present embodiment, the additive layer Md is formed with a thickness Th that provides rigidity enough to withstand grinding by the grinding portion 200 in steps S46 and S48. Therefore, it is not necessary to prepare the workpiece WP with hardness enough to support the additive layer Md during grinding in steps S46 and S48. Hence, it is possible to prepare the workpiece WP with hardness that meets the purpose of use of the workpiece WP as a product, irrespective of the content of grinding in steps S46 and S48. In addition, it is also not necessary to perform a surface treatment on the workpiece WP so as to provide hardness enough to support the additive layer Md during grinding prior to grinding in steps S46 and S48.

In the present embodiment, in addition, the additive layer Md is formed on the surface of the workpiece WP with a thickness enough to achieve rigidity enough to withstand an expected value of a maximum load at the time when the workpiece WP is used as a product. Therefore, it is not necessary to prepare the workpiece WP with hardness enough to support the additive layer when the workpiece is used as a product and receives a load. In addition, it is also not necessary to perform a surface treatment on the workpiece WP so as to provide hardness enough to support the additive layer Md when the workpiece is used as a product. A functional unit of the CPU 940 that implements a process of performing overlay processing by controlling the various portions in step S43 is indicated as an overlaying unit 943 in FIG. 1.

In step S44 in FIG. 6, a hole filling process is performed on the workpiece WP. More specifically, the control unit 900 controls the first beam emission portion 32 of the additive manufacturing portion 300 so as to repair defects such as cracks, holes, and chips formed during formation of the additive layer Md by melting a part of the surface of the workpiece WP on which the additive layer Md is formed in step S43. That is, the first light beam LB1 is emitted to the defects and surrounding areas on the surface of the additive layer Md to melt a part of the material constituting the surface so as to flow into the defects and fill the defects. At this time, the material supply portion 33 does not supply the cemented carbide powder Mf. In addition, the second beam emission portion 39 does not emit the second light beam LB2.

By performing such processes, it is possible to improve the properties of the surface of the additive layer Md even when defects such as cracks and chips are formed on the surface of the additive layer Md in overlay processing of a hard material in step S43. Therefore, it is possible to form an additive layer Md with high shape precision made of cemented carbide on the surface Sw of the workpiece WP through the subsequent processes in steps S46 and S48. A functional unit of the CPU 940 that implements a process of performing a hole filling process by controlling the various portions in step S44 is indicated as a hole filling unit 944 in FIG. 1.

After the hole filling process, the additive manufacturing portion 300 is moved into the cover 51 under control by the control unit 900 (see Az3 in FIG. 4). After that, the lid portion 52 of the protection portion 500 is disposed at the closed position Pc (see the center part of FIG. 4). When the lid portion 52 is located at the closed position Pc, the opening 53 of the cover 51 is closed by the lid portion 52. The grinding portion 200 is moved to a position closer to the rotational axis of the headstock 13 than the state in FIG. 5 (see Az2 in FIG. 4).

In step S46, rough grinding is performed on the workpiece WP. More specifically, the grinding portion 200 performs rough grinding on the additive layer Md formed on the workpiece WP by bringing the grindstone wheel 21 into contact with the workpiece WP, being rotated by the holding portion 100, while rotating the grindstone wheel 21. The coolant supply portion 400 supplies the coolant CL to the portion CP at which the workpiece WP held by the holding portion 100 and the grindstone wheel 21 contact each other. As a result, the peaks formed on the surface of the additive layer Md are roughly removed. At this time, the grindstone wheel 21 for rough grinding in step S46 is attached to the grinding portion 200. The lid portion 52 of the protection portion 500 is disposed at the closed position Pc (see the center part of FIG. 4). The first beam emission portion 32, the second beam emission portion 39, and the detection portion 38 are covered by the cover 51 of the protection portion 500 (see FIG. 4). A functional unit of the CPU 940 that implements a process of performing rough grinding by controlling the various portions in step S46 is indicated as a second rough grinding unit 946 in FIG. 1.

In the present embodiment, in step S43, the control unit 900 controls the additive manufacturing portion 300 to form an additive portion Md made of the hard material Mx on the surface Sw of the workpiece WP held by the holding portion 100. After that, in step S46, the control unit 900 controls the grinding portion 200 to perform removal processing on the additive portion Md formed on the workpiece WP held by the holding portion 100. That is, the composite grinding machine 1 forms the additive portion Md of a hard material on the surface Sw of the workpiece WP and performs grinding on the additive portion Md without removing the workpiece WP and attaching the workpiece WP again. Therefore, the processes of forming an additive portion Md on the surface Sw of the workpiece WP and shaping the additive portion Md through removal processing can be performed efficiently compared to an aspect in which different devices are used to form an additive portion Md on the surface Sw of the workpiece WP and perform grinding on the additive portion Md.

After the completion of rough grinding, the grinding portion 200 is moved to a position farther from the rotational axis of the headstock 13 than the state in FIG. 4 (see Az2 in FIG. 5). The grindstone wheel for rough grinding in step S46 attached to the grinding portion 200 is replaced with a grindstone wheel for finish grinding in step S48. After that, the grinding portion 200 is moved to a position closer to the rotational axis of the headstock 13 than the state in FIG. 5 (see Az2 in FIG. 4).

In step S48, finish grinding is performed on the workpiece WP. More specifically, the grinding portion 200 performs finish grinding on the additive layer Md formed on the workpiece WP by bringing the grindstone wheel 21 into contact with the workpiece WP, being rotated by the holding portion 100, while rotating the grindstone wheel 21. The coolant supply portion 400 supplies the coolant CL to the portion CP at which the workpiece WP held by the holding portion 100 and the grindstone wheel 21 contact each other. As a result, the surface of the additive layer Md is processed to be flat with high precision. At this time, the grindstone wheel 21 for finish grinding in step S48 is attached to the grinding portion 200. The lid portion 52 of the protection portion 500 is disposed at the closed position Pc (see the center part of FIG. 4). The first beam emission portion 32, the second beam emission portion 39, and the detection portion 38 are covered by the cover 51 of the protection portion 500 (see FIG. 4). A functional unit of the CPU 940 that implements a process of performing finish grinding by controlling the various portions in step S48 is indicated as a finish grinding unit 948 in FIG. 1.

With the composite grinding machine 1 according to the present embodiment, as described above, the processes from formation of a hard film to finish grinding can be executed without using other processing machines (see S40 in FIG. 6). After the completion of finish grinding, the grinding portion 200 is moved to a position farther from the rotational axis of the headstock 13 than the state in FIG. 4 (see Az2 in FIG. 5).

In step S50, the workpiece WP is removed from the headstock 13 of the composite grinding machine 1 (see the lower part of FIG. 1), and transported to a predetermined finished product storage site. Processing of the workpiece WP is completed through the above processes.

Figure 7:
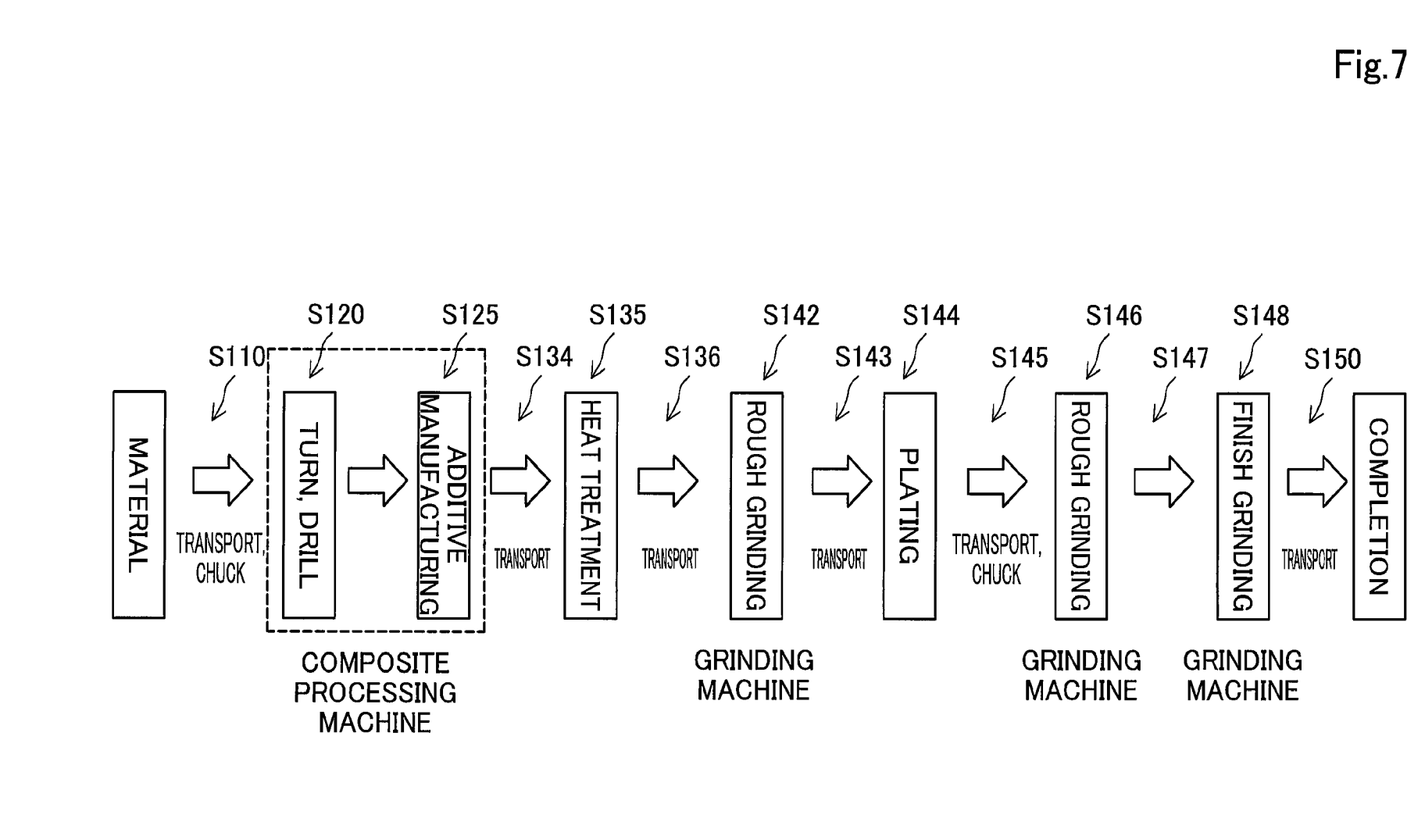
FIG. 7 is a flowchart illustrating conventional processing of the workpiece WP.

FIG. 7 is a flowchart illustrating conventional processing of the workpiece WP. First, as in the processing in FIG. 6, a cylindrical workpiece WP before being processed is prepared as a material to be processed (see the right part of FIG. 7).

In step S110, the workpiece WP is transported to a composite processing machine that can perform additive manufacturing and cutting, and attached to a chuck of the composite processing machine. This composite processing machine can perform additive manufacturing on steel other than high-speed steel. This composite processing machine cannot perform additive manufacturing on hard materials. In addition, this composite processing machine can perform cutting on aluminum and steel other than high-speed steel. This composite processing machine cannot cut or grind hard materials.

In step S120, turning and drilling are performed on the workpiece WP using the composite processing machine. In step S125, overlay processing is performed. More specifically, an additive portion is formed on the surface Sw of the workpiece WP through additive manufacturing by the composite processing machine.

In step S134, the workpiece WP is removed from the composite processing machine. Then, the workpiece WP is transported to a quenching device, and accommodated in the quenching device. In step S135, a quenching process as a heat treatment is performed on the workpiece WP using the quenching device.

In the process according to the present embodiment illustrated in FIG. 6, on the other hand, a heat treatment is not performed on the workpiece WP by the first beam emission portion 32 or the second beam emission portion 39 before grinding is performed on the additive layer Md in steps S46 and S48. Therefore, it is possible to shorten the time required to form an additive layer Md on the surface Sw of the workpiece WP compared to the aspect in FIG. 7 in which a heat treatment is performed on the workpiece WP in step S135 in FIG. 7 before grinding of the additive layer. In addition, it is also possible to shorten the time required to form an additive layer Md on the surface Sw of the workpiece WP compared to an aspect in which a heat treatment is performed on the workpiece WP by the first beam emission portion 32 or the second beam emission portion 39 before grinding of the additive layer Md.

In step S136, the workpiece WP is taken out of the quenching device. Then, the workpiece WP is transported to a conventional grinding machine, and attached to a headstock of the grinding machine.

In step S142, rough grinding is performed on the workpiece WP in the grinding machine. At this time, the grindstone wheel 21 for rough grinding in step S142 is attached to the grinding machine.

After rough grinding, the grindstone wheel for rough grinding in step S142 attached to the grinding machine is replaced with a grindstone wheel for rough grinding in step S146.

In step S143, the workpiece WP is removed from the grinding machine. Then, the workpiece WP is transported to a plating bath, and the workpiece WP is immersed in a plating solution in the plating bath.

In step S144, electroplating is performed on the surface Sw of the workpiece WP using hexavalent chromium. As a result, a hard chromium plating layer as an additive layer made of cemented carbide is formed on the surface Sw of the workpiece WP. Since the process in step S144 is performed through electroplating, however, the thickness of the additive layer formed in step S144 is equal to or less than 1 mm.

In the process according to the present embodiment illustrated in FIG. 6, on the other hand, the additive layer Md is formed on the surface Sw of the workpiece WP through DED (see S43 in FIG. 6). It is possible to form the additive layer Md with a thickness of about 3 mm on the surface Sw of the workpiece WP through DED. Therefore, the additive layer Md can be formed on the surface Sw of the workpiece WP with a thickness Th that provides rigidity and a yield stress high enough to allow the additive layer Md to withstand grinding by the grinding portion 200 in steps S46 and S48. In the process according to the present embodiment illustrated in FIG. 6, in addition, it is not necessary to use hexavalent chromium. Therefore, it is not necessary to treat and manage hexavalent chromium.

In step S145, the workpiece WP is taken out of the plating bath. Then, the workpiece WP is transported to the conventional grinding machine, and the workpiece WP is attached to the headstock of the grinding machine (see the lower part of FIG. 1). Since it is not easy to process a film of hard metal, the grinding machine that is used in steps S146 and S148 is a dedicated grinding machine that can grind a film of hard metal. However, the same grinding machine is also used in step S142 in FIG. 7.

In step S146, rough grinding is performed on the workpiece WP. At this time, the grindstone wheel 21 for rough grinding in step S146 is attached to the grinding machine.

In step S147, the grindstone wheel for rough grinding in step S146 attached to the grinding machine is replaced with a grindstone wheel for finish grinding in step S148.

In step S148, finish grinding is performed on the workpiece WP. At this time, the grindstone wheel 21 for finish grinding in step S48 is attached to the grinding portion 200.

In step S150, the workpiece WP is removed from the headstock of the composite grinding machine, and transported to a predetermined finished product storage site. Conventional processing of the workpiece WP is completed through the above processes.

In the conventional processing, the workpiece WP is sequentially attached to the composite processing machine, the grinding machine, the quenching device, the plating bath, and the grinding machine while steps S120 to S148 are performed. In the attachment to the composite processing machine, the first attachment to the grinding machine, and the second attachment to the grinding machine, the respective positions of attachment of the workpiece WP to the processing devices are offset from each other, and as a result the respective centers of rotation of the workpiece WP in the processing devices are offset from each other. Therefore, it is necessary to set a so-called processing allowance to be large in the processes performed on the workpiece WP using the conventional composite processing machine and grinding machine, in addition to the plating process.

In steps S42, S43, S44, S46, and S48 according to the present embodiment, on the contrary, additive manufacturing and grinding as removal processing are performed on the workpiece WP using the composite grinding machine 1 (see S40 in FIG. 6). Therefore, the work of conveying the workpiece WP between the processing devices and attaching the workpiece WP is not needed between the processes. Hence, with the composite grinding machine 1, it is possible to shorten the time required to process the workpiece WP compared to the processes in FIG. 7. In other words, the composite grinding machine 1 can efficiently perform the process of forming an additive portion Md on the surface Sw of the workpiece WP and shaping the additive portion Md through removal processing. As a result, the cost of processing the workpiece WP can also be reduced.

In the present embodiment, additive manufacturing and grinding as removal processing are performed by a single composite grinding machine 1 (see S40 in FIG. 6). Therefore, it is possible to reduce a space required for such processes in a factory compared to the aspect in FIG. 7 in which a conventional composite processing machine, a plating bath, and a grinding machine are used.

The composite grinding machine 1 according to the present embodiment is also called a "composite processing machine". The grinding portion 200 is also called a "removal processing portion". The grindstone wheel 21 is also called a "grindstone".

B. Other Embodiments

B1. Different Embodiment 1

(1) In the above embodiment, the first beam emission portion 32 and the second beam emission portion 39 of the additive manufacturing portion 300 emit a laser beam. However, the additive manufacturing portion may heat and melt a material by applying arc plasma or an electron beam instead of a laser beam.

(2) In the above embodiment, the material supply portion 33 supplies the cemented carbide powder Mf containing tungsten and cobalt to the outside of the additive manufacturing portion 300. However, the material of the additive layer Md may be a variety of materials such as an Fe-based alloy, a Ni-based alloy, a Co-based alloy, a Cu-based alloy, an Al-based alloy, and ceramics. Chromium, cobalt, vanadium, etc. may be added to these alloys.

The material of the workpiece may be a variety of materials such as carbon steel, bearing steel, stainless steel, and aluminum.

(3) In the above embodiment, the material supply portion 33 supplies the cemented carbide powder Mf to the outside of the additive manufacturing portion 300. However, the material supply portion may supply the material in the form of a wire. Alternatively, the material supplied by the material supply portion may be high-speed steel, rather than cemented carbide.

(4) In the above embodiment, the grinding portion 200 and the additive manufacturing portion 300 are moved in the Z-axis direction, and the holding portion 100 is moved in the X-axis direction. However, one of the grinding portion and the holding portion may be configured to be movable in two directions that are perpendicular to each other. That is, the composite grinding machine may be configured such that the grinding portion may take any position within a plane relative to the holding portion. Furthermore, one of the additive manufacturing portion and the holding portion may be configured to be movable in two directions that are perpendicular to each other. That is, the composite grinding machine may be configured such that the additive manufacturing portion may take any position within a plane relative to the holding portion.

(5) In the above embodiment, the cover 51 covers the entirety of the first beam emission portion 32, the second beam emission portion 39, and the detection portion 38. However, the cover may be configured not to cover a part of an optical device such as a portion of the first beam emission portion 32 on the opposite side of a portion at which a window portion 32w that allows passage of the first light beam LB1 is provided or a portion on the opposite side of a portion at which a window portion that allows passage of external light taken into the detection portion 38 is provided, for example.

(6) In the above embodiment, the detection portion 38 is an infrared camera. However, the detection portion may include a different component such as a digital still camera that records visible light or a camera that can record a movie. It is only necessary that the detection portion should be configured to detect a coolant applied to the surface of a workpiece.

(7) In the above embodiment, the holding portion 100 and the grinding portion 200 implement a function as a cylindrical grinding machine. However, the holding portion and the grinding portion may constitute a surface grinding machine that grinds the surface of a workpiece held by the holding portion by moving the holding portion and the grinding portion relative to each other in two directions along the direction of the outer peripheral surface of a grindstone wheel.

B2. Different Embodiment 2

In the above embodiment, the control unit 900 controls the output of the second light beam LB2 such that the reduction speed of the temperature of the molten cemented carbide is kept at 540° C./second or less (see FIG. 2). However, such control may not be performed, and the second light beam may be emitted with a constant output. Alternatively, an aspect in which the composite processing machine includes a first beam emission portion and does not include a second beam emission portion is also possible.

B3. Different Embodiment 3

In the above embodiment, the grinding portion 200 of the composite grinding machine 1 performs grinding by bringing the grindstone wheel 21 into contact with the workpiece WP while rotating the grindstone wheel 21 (see FIG. 4). However, an aspect in which the composite processing machine includes a cutting machine that can cut a workpiece in place of the grinding portion 200 is also possible. Hard materials with a Vickers hardness of less than 900 can be cut, for example.

In additive shaping to be performed on a workpiece, it is preferable to form an additive layer with a thickness that is enough to withstand removal processing by a removal processing portion such as grinding and cutting. The expression "thickness that is enough to withstand removal processing by a removal processing portion" refers to a thickness that does not allow the additive layer to be cracked and that allows the additive layer to be elastically deformed slightly to such a degree that the additive layer can be processed with the required precision of dimensions and shape during removal processing by a removal processing portion.

B4. Different Embodiment 4

In step S43 according to the above embodiment, the control unit 900 controls the additive manufacturing portion 300 to form an additive layer Md with a thickness Th that allows the additive layer Md itself to withstand grinding by the grinding portion 200 in steps S46 and S48 (see FIG. 2). However, an aspect in which the composite processing machine does not form the additive layer Md with such a thickness is also possible. In such an aspect, it is preferable to prepare a workpiece with hardness enough to support an additive layer during grinding.

B5. Different Embodiment 5

In the above embodiment, a heat treatment is not performed on the workpiece WP by the first beam emission portion 32 or the second beam emission portion 39 before grinding performed on the additive layer Md in steps S46 and S48 in FIG. 6. However, a heat treatment such as quenching may be performed on the surface of the workpiece by the first beam emission portion and/or the second beam emission portion as heating means of the additive manufacturing portion, prior to additive manufacturing. Furthermore, the workpiece may be conveyed to a heat treatment device that is different from the composite processing machine, and a heat treatment may be performed on the workpiece by the heat treatment device, prior to additive manufacturing by the composite processing machine. By performing such processing, the base material of the workpiece and the additive layer can implement a configuration that does not allow the additive layer to be cracked and that allows the additive layer to be elastically deformed slightly to such a degree that the additive layer can be processed with the required precision of dimensions and shape during grinding.

B6. Different Embodiment 6

In step S44 according to the above embodiment, the control unit 900 controls the first beam emission portion 32 of the additive manufacturing portion 300 so as to repair defects such as cracks and chips on the surface of the additive layer Md by melting a part of the surface of the additive layer Md (see FIG. 6). However, an aspect in which the composite processing machine does not perform such processing is also possible. By providing an additive layer by supplying a hard material and controlling an output of a beam irradiation portion with sufficient precision in additive manufacturing, it is possible to form an additive layer Md with sufficiently few defects such as cracks, holes, and chips on the surface Sw of the workpiece WP.

The present disclosure is not limited to the embodiment discussed above, and can be implemented with a variety of configurations without departing from the spirit of the present disclosure. For example, the technical features of the embodiment corresponding to the technical features in each aspect described in the SUMMARY OF THE INVENTION can be replaced or combined, as appropriate, in order to solve some or all of the issues discussed above or achieve some or all of the effects discussed above. In addition, technical features can be deleted, as appropriate, unless such technical features are described as essential herein.

DESCRIPTION OF THE REFERENCE NUMERALS

1 . . . composite grinding machine, 12 . . . table, 13 . . . headstock, 14 . . . tailstock, 15 . . . chuck, 16 . . . center, 20 . . . grindstone head, 21 . . . grindstone wheel, 21a . . . cylindrical grinding surface, 22 . . . grindstone drive motor, 23 . . . grindstone shaft, 24 . . . belt transmission mechanism, 32 . . . first beam emission portion, 32w . . . window portion, 33 . . . material supply portion, 34 . . . oscillation portion, 35 . . . optical system, 38 . . . detection portion, 39 . . . second beam emission portion, 51 . . . cover, 52 . . . lid portion, 53 . . . opening, 57 . . . pressurization portion, 100 . . . holding portion, 200 . . . grinding portion, 300 . . . additive manufacturing portion, 400 . . . coolant supply portion, 500 . . . protection portion, 800 . . . bed, 900 . . . control unit, 940 . . . CPU, 942 . . . first rough grinding unit, 943 . . . overlaying unit, 944 . . . hole filling unit, 946 . . . second rough grinding unit, 948 . . . grinding unit, 950 . . . RAM, 960 . . . ROM, 970 . . . display, 980 . . . keyboard, Ax1 . . . arrow indicating movement of holding portion 100, Az2 . . . arrow indicating movement of grinding portion 200, Az3 . . . arrow indicating movement of additive manufacturing portion 300, CL . . . coolant, CP . . . portion at which workpiece WP and grinding wheel 21 contact each other, LB1 . . . first light beam, LB2 . . . second light beam, Md . . . additive layer, Mf . . . powder, Mx . . . hard material, Pc . . . closed position of lid portion 52, Po . . . open position of lid portion 52, Sw . . . surface of workpiece WP, Th . . . thickness of additive layer Md, WP . . . workpiece

The invention claimed is:

1. A composite processing machine comprising:
   a holding portion that is configured to hold a workpiece;
   a removal processing portion that performs removal processing on the workpiece held by the holding portion, the removal processing portion configured to perform removal processing of a hard material, and includes a grinding wheel, and performs grinding by bringing the grinding wheel into contact with the workpiece being held by the holding portion while rotating the grinding wheel;
   an additive manufacturing portion that applies the hard material to a surface of the workpiece held by the holding portion by melting the hard material while supplying the hard material to the surface, and forms an additive layer as the additive portion by applying the hard material to the surface of the workpiece being held by the holding portion; and
   a control unit that controls the composite processing machine, wherein the control unit is configured to:
      control the additive manufacturing portion to form an additive portion made of the hard material on the surface of the workpiece held by the holding portion; and
      control the removal processing portion to perform removal processing on the additive portion formed on the workpiece held by the holding portion, wherein:
   the additive manufacturing portion includes
      a material supply portion that supplies powder of cemented carbide as the hard material,
      a first beam emission portion that emits a first light beam that melts the powder of the cemented carbide, and
      a second beam emission portion that emits a second light beam; and
   the control unit controls the additive manufacturing portion to apply the molten cemented carbide as the additive portion to the surface by causing the material supply portion to supply the powder and causing the first beam emission portion to emit the first light beam toward the powder, and reduce a reduction speed of a temperature of the molten cemented carbide by causing the second beam emission portion to emit the second light beam toward the molten cemented carbide.

2. The composite processing machine according to claim 1, wherein the control unit controls the additive manufacturing portion to keep the reduction speed at 540° C./second or less by causing the second beam emission portion to emit the second light beam toward the molten cemented carbide.

3. The composite processing machine according to claim 1, wherein the control unit controls the additive manufacturing portion to form the additive layer on the surface of the workpiece with a thickness that is enough to withstand the removal processing by the removal processing portion.

4. The composite processing machine according to claim 1, wherein the control unit controls the additive manufacturing portion to form the additive layer on the surface of the workpiece with a thickness that is enough to withstand an expected value of a maximum load applied when the workpiece is used as a product.

5. The composite processing machine according to claim 3, wherein the control unit does not perform a heat treatment of the workpiece before the removal processing performed on the additive layer.

6. The composite processing machine according to claim 1, wherein the control unit is configured to repair a defect on a surface of the additive layer by melting a part of the surface of the additive layer by controlling at least one of the first beam emission portion of the additive manufacturing portion and the second beam emission portion of the additive manufacturing portion after formation of the additive layer.

* * * * *